Patented July 30, 1946

2,405,041

UNITED STATES PATENT OFFICE 2,405,041

PREPARATION OF METHYL POLYSILOXANE RESINS

Kenneth N. Mathes and Bridget A. Wasiewicz, Schenectady, N. Y., assignors to General Electric Company, a corporation of New York No Drawing. Application May 19, 1944, Serial No. 536,435

5 Claims. (Cl. 260—2)

The present invention relates to the preparation of improved methyl polysiloxane resins.

The methyl polysiloxane resins, more generally referred to as methyl silicone resins, with which the present invention is specifically concerned are resins of the type described and claimed in Patent 2,258,218 issued to Eugene G. Rochow having an average methyl-to-silicon ratio greater than 1 and less than 2. They may be prepared, for example, by hydrolysis and dehydration of mixtures of methyl silicon halides (or mixtures of such halides with a silicon tetrahalide) in such proportions as to give resinous condensation products of the desired methyl-to-silicon ratio. Such resins are heat-hardenable and are characterized by a heat-resistance superior to ordinary organic resins. However, the curing of these resins in general involves a rather long baking schedule at comparatively elevated temperatures during which appreciable quantities of low boiling materials are continuously given off. While an improvement in the rate of cure has been obtained by treating the methyl polysiloxane condensation products in solution and at elevated temperatures with certain metal halides, such as ferric chloride hexahydrate and antimony pentachloride as described and claimed in the copending application of James G. E. Wright and James Marsden, S. N. 455 615, filed August 21, 1942, now Patent No. 2,389,477, issued November 20, 1945 and assigned to the same assignee as the present invention, the resultant products, referred to hereinafter as "pre-condensed" silicones, are still slow curing as compared with most organic resins.

The present invention is based on the discovery that methyl polysiloxane resins, having improved curing and bonding properties and exhibiting less thermoplastic flow and greater solvent resistance than known silicone resins, can be obtained by solvent extraction of methyl polysiloxane resins with nitro paraffins containing from 2 to 4 carbon atoms, particularly the 1- and 2-nitropropanes. The resinous products remaining after treatment with the nitroparaffin solvent are useful for making rigid coil forms and for use in general as coating and impregnating varnishes. Coatings of the resins become hard and tack-free as soon as the solvents are removed. Films of the cured resins have been heated for as long as 76 hours at 300 deg. C. without crazing.

The present invention is applicable to any soluble or liquid methyl polysiloxane resin including those resins which have been "pre-condensed" in accordance with the process described in the aforementioned Wright and Marsden application. Before subjecting the resin to solvent extraction, most or all of any other solvent such as toluene, ether, or the like present in the resin is removed by gentle heating. The remaining resinous product then is mixed with from about one to four parts by weight of 1-nitropropane (or equivalent nitroparaffin containing from 2 to 4 carbon atoms) and the mixture agitated and preferably heated for a short time to an elevated temperature below the boiling point of the solvent. As the mixture cools, a gel-like resinous precipitate forms. This insoluble precipitate is separated from the dark supernatant liquid and may then be taken up in sufficient toluene, xylol or other suitable solvent to form a varnish of the required viscosity. As the extracted resin will ordinarily retain a small amount of the nitroparaffin, it may be desirable to wash the precipitate with equal parts of acetone to remove most or all of the extraction solvent before the resin is made into a varnish. Both the nitroparaffin and the acetone can be recovered by distillation from the respective supernates leaving an oily, dark residue comprising the most soluble, low-boiling polysiloxanes. These may be employed, for example, as plasticizers for other polysiloxane resins in applications where the presence of low-boiling materials is not objectionable. They may also be applied to cured organo-polysiloxane films to soften or plasticize such films.

The nitropropane-insoluble resins prepared as described above possess a number of advantages over the methyl polysiloxane resins known prior to my invention. They can be readily cured at baking temperatures ranging from 25 to 75 degrees lower than the baking temperatures required for curing the "pre-condensed" resins or they may be cured at the same temperatures with less evidence of thermoplastic flow. The solvent extracted resins also exhibit greater abrasion and solvent resistance at normal and elevated temperatures than do the known methyl polysiloxanes. When used for filling and bonding coil structures, advantage may be taken of the fact that the solvent-extracted resins need not be in the form of thin films for thorough curing. While the dielectric strength of the cured solvent extracted resins is about the same as the cured "pre-condensed" resins, the solvent-extracted resins maintain their good dielectric strength for much longer times at elevated temperatures (200 deg. C.).

In addition to their use for impregnating and bonding coil structures and for coating and impregnating sheet insulating materials such as glass fiber and asbestos sheet materials, the solvent-extracted resins prepared in accordance with the present invention possess superior adhesive properties and can be used, with or without a solvent, as general adhesives in the manufacture of laminated products comprising mica flakes, glass cloth, polysiloxane resin-impregnated glass cloth, asbestos, and the like.

What we claim as new and desire to secure by Letters Patent of the United States is:

1. The process which comprises mixing a toluene-soluble methyl polysiloxane resin having a methyl-to-silicon ratio greater than 1 and less than 2 with a nitroparaffin containing from 2 to 4 carbon atoms, and recovering the portion of said resin insoluble in the nitroparaffin.

2. The process which comprises agitating a toluene-soluble methyl polysiloxane resin having a methyl-to-silicon ratio greater than 1 and less than 2 with a nitropropane, and recovering the portion of said resin insoluble in said nitropropane.

3. The process of treating a toluene-soluble methyl polysiloxane resin having a methyl-to-silicon ratio greater than 1 and less than 2 to improve its solvent resistance and curing properties which comprises agitating said resin with a nitroparaffin containing from 2 to 4 carbon atoms, and recovering the nitroparaffin-insoluble portion of said resin.

4. The process of treating a toluene-soluble methyl polysiloxane resin containing an average of from about 1 to less than two methyl groups attached to silicon atoms to obtain a product of improved curing properties which comprises mixing said resin with from 2 to 4 parts by weight of a nitropropane at an elevated temperature below the boiling point of the nitropropane, allowing said mixture to cool and recovering the nitropropane-insoluble product.

5. The process of solvent-extracting a toluene-soluble methyl polysiloxane resin having a methyl-to-silicon ratio greater than 1 and less than 2 to obtain a product of improved curing properties which comprises mixing said resin with from 2 to 4 parts of nitropropane to remove the nitropropane-soluble constituents of said resin.

KENNETH N. MATHES.
BRIDGET A. WASIEWICZ.